United States Patent
Wheatley

(10) Patent No.: US 6,746,741 B2
(45) Date of Patent: Jun. 8, 2004

(54) CARBON FIBER REINFORCEMENT SYSTEM

(76) Inventor: Donald Edward Wheatley, 1119 Wright, Ann Arbor, MI (US) 48105

( * ) Notice: Subject to any disclaimer, the term of this patent is extended or adjusted under 35 U.S.C. 154(b) by 47 days.

(21) Appl. No.: 09/736,853

(22) Filed: Dec. 13, 2000

(65) Prior Publication Data

US 2002/0071925 A1 Jun. 13, 2002

(51) Int. Cl.$^7$ ................................. B32B 3/26
(52) U.S. Cl. ................. 428/40.1; 428/41.5; 428/41.7; 428/41.8; 428/42.1; 428/408; 442/85; 442/103; 442/149; 442/179
(58) Field of Search ............................. 428/40.1, 41.5, 428/41.7, 41.8, 42.1, 408, 913; 442/85, 103, 149, 179

(56) References Cited

U.S. PATENT DOCUMENTS

| | | |
|---|---|---|
| 4,916,874 A | 4/1990 | McCoy et al. |
| 5,635,263 A | * 6/1997 | Saito .................. 428/40.1 |
| 5,640,825 A | 6/1997 | Ehsani et al. |
| 5,649,398 A | 7/1997 | Isley, Jr. et al. |
| 5,845,450 A | 12/1998 | Larsen |
| 5,894,003 A | 4/1999 | Lockwood |
| 6,145,260 A | 11/2000 | Morton |

OTHER PUBLICATIONS

ACI Structural Journal, Technical Paper, Title No. 91–S17, Mar.–Apr. 1994, "Strengthening Of Initially Loaded Reinforced Concrete Beams Using FRP Plates", By Alfarabi Sharif, G.J. Al–Sulaimani, I.A. Basunbul, M.H. Baluch, and B.N. Ghaleb.

ACI Structural Journal, Technical Paper, Title No. 91–S34, May–Jun. 1994, "Fiber Composites For New And Existing Structures", By Hamid Saadatmanesh.

* cited by examiner

*Primary Examiner*—Nasser Ahmad
(74) *Attorney, Agent, or Firm*—Harness, Dickey & Pierce, P.L.C.

(57) ABSTRACT

An article and method for reinforcing structural elements is provided. The article includes a carbon fiber strip with a removable cover sheet. Upon removal of the cover sheet, a clean and roughened surface on the strip, defined in part by a bonding agent, is exposed. The product is adhered to a structural element by applying an epoxy to the structural element and placing the roughened surface of the carbon fiber strip onto the epoxy. To firmly adhere the article to the structural element, uniform pressure is applied with the help of an external vacuum pump until the epoxy cures and the product is firmly adhered to the structural element.

10 Claims, 3 Drawing Sheets

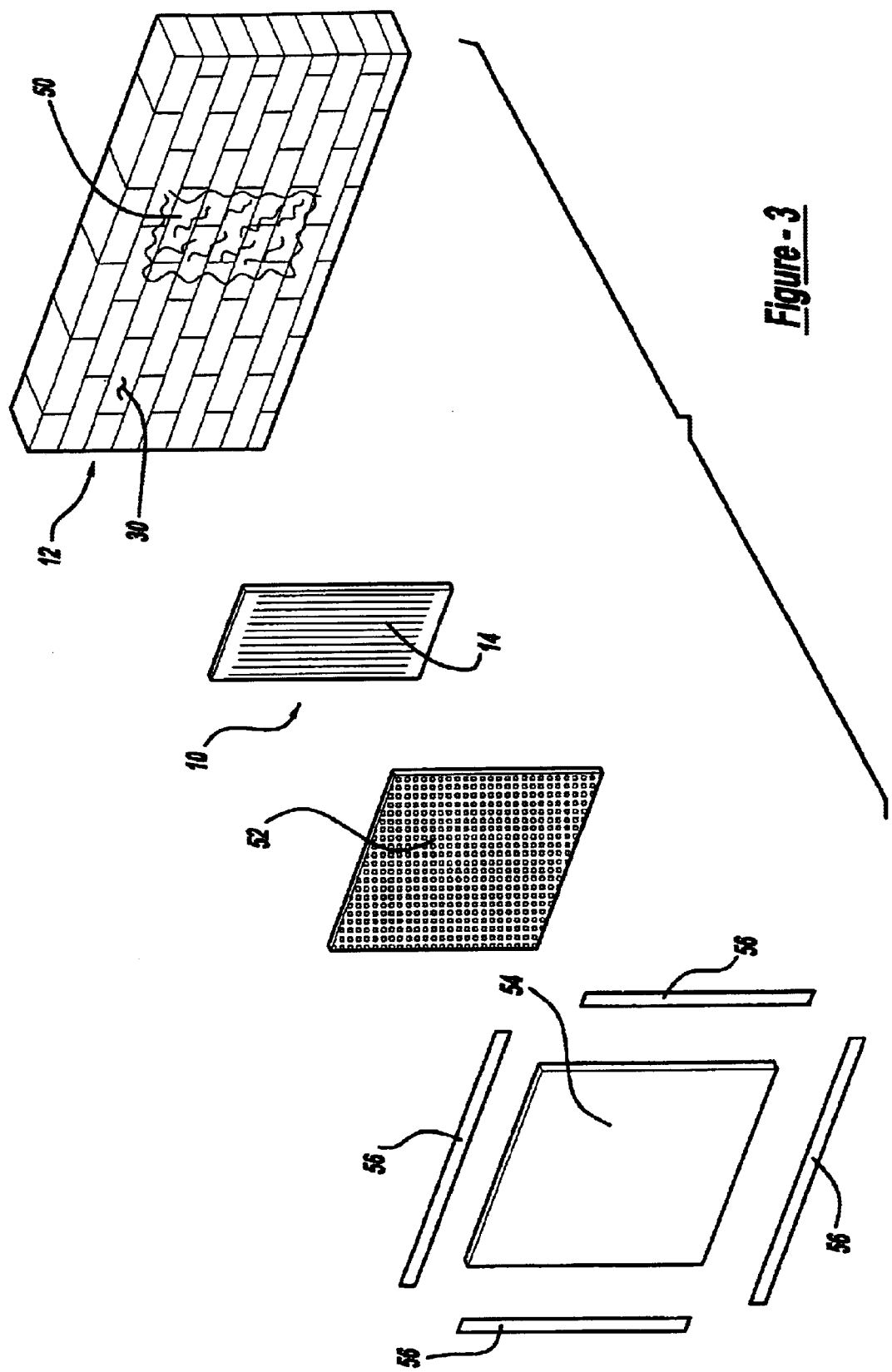

CARBON FIBER REINFORCEMENT SYSTEM

BACKGROUND OF THE INVENTION

This invention relates to a system and product for reinforcing structural elements and a method for attaching the product to those structures. In particular, the invention includes strips of carbon fiber material designed for adherence to a structural element such as a cinder or concrete block wall.

DESCRIPTION

Walls constructed of concrete blocks are well known in the field of construction and have been extensively used for walls both above and below ground. Walls constructed in this manner are generally capable of supporting residential and light commercial structures and are relatively inexpensive to manufacture.

In order to construct a concrete wall, individual blocks are laid end to end and successive rows or courses are stacked thereon. Mortar between each adjacent block and row secures the wall together These walls are such that they have excellent compressive strength to support structures placed upon them. However, these walls are inherently weak with respect lateral loads and are particularly susceptible to cracking from water pressure. This inherent weakness is attributable to the structural characteristics of the walls themselves and the mortar joints at which they are connected. Specifically, the mortar joints are weak in tension, and when subjected to tensile forces, tend to separate relatively easily.

Water penetrating deeply into the soil adjacent a basement wall can cause substantial lateral movement of the soil and pressure against a wall. Over a period of time, block walls may be seen to develop diagonal cracks at their ends and vertical cracks near their centers. Such cracks can admit water from the surrounding soil and, if left untreated, can progressively widen and eventually facilitate collapse of the entire wall with resultant damage to the structure supported on it. In addition to developing such cracks, under such pressure block walls typically either tilt or bow inwardly and such bowing or tilting steadily worsens with the weight of the overlying structure.

One of the traditional methods of repairing the leaks and cracks and relieving the external pressure is to drill holes and provide for channeling of the water away on the inside. Yet another method is to fill the cracks and leaks is by injection of an epoxy resin into the cracks. Although these methods will control or prevent further water from entering the existing cracks, they do not bind the concrete walls and prevent further cracking or bowing of the concrete walls.

Yet another means of correcting the cracks in the walls is to use fiberglass cloth with epoxy or polyester resin. Fiberglass has good tensile properties and can carry the load on the interior of the basement walls that is in tension. However, one of the major drawbacks with this method is that mixing the epoxy or polyester and wetting out the fabric is time consuming and messy.

In recent years, technology has developed whereby the concrete walls are reinforced using precut strips of carbon fiber. This prevents the walls from cracking or collapsing. However, precut carbon fiber strips have to be cleaned and roughened, commonly done through sanding, to provide mechanical adhesion with the walls. The sanding process is not only time consuming, but is completely dependent on the skill of the operator in sanding the surface of the strip. This results in extra cost in transporting and storing the precut strips.

With the limitations of the prior art in mind, it is an object of the present invention to provide an article for reinforcing a structure element to effectively resist bending or other lateral forces applied to the structure element.

Another object of the present invention is to provide an article that does not require any sanding to enhance mechanical adhesion in order to attach to the article to the structural element and one which will remain sufficiently clean at a job site.

It is yet another object of the present invention to provide a method whereby an article for use in reinforcing is firmly adhered to the structural element, thereby reinforcing the structural member.

It is yet another object of the present invention to use existing materials to apply uniform pressure to firmly adhere the article to the structural element, thereby resulting in a strong reinforced structural element.

Another object of the present invention is to provide an article and method which is economical, efficient in operation, capable of a long operating life.

SUMMARY OF THE PRESENT INVENTION

In accordance with the preferred embodiment of the present invention, an article (a reinforcing member) and method for reinforcing structural elements, such as concrete walls, support beams and the like, are provided.

The article in accordance with the present invention comprises a carbon fiber strip with an exposed roughened surface. In order to make the article, epoxy resin is applied to a carbon fibers. The epoxy resin is allowed to permeate the thickness of the carbon fibers. Due to the uneven surface of the carbon fibers, a thin layer of epoxy forms on a top or exterior of the carbon fiber. A plastic cover sheet is then placed on top of the carbon fiber. Carbon fiber material with the epoxy and the plastic fiber is then subject to high heat and pressure to cure the epoxy thereby forming the carbon fiber into a rigid sheet, with an adhered cover sheet, that can be cut into strips. At the job site, the cover sheet is readily removed and resultant sheet of carbon fiber will have a roughened surface defined by the epoxy resin where it had adhered to the cover sheet.

The method of adhering the product to a structural element comprises the steps of applying a second epoxy resin to the structural element; adhering the product to the second epoxy resin; allowing the second resin to cure while applying pressure to the article and structural element. Pressure may be applied through use of an overlying plastic sheet, the edges of which are sealed with the help of an adhesive to the structural element. A uniform pressure is applied with the help of an external vacuum pump and the vacuum is applied until the epoxy is cured and the product firmly fixed to the structural element.

BRIEF DESCRIPTION OF THE DRAWINGS

FIG. 3 is an exploded view of the various elements used to adhere the reinforcing article being attached to a structural element in accordance with the teachings of the present invention;

DETAILED DESCRIPTION OF THE PREFERRED EMBODIMENT

The following description of the preferred embodiment is merely exemplary in nature, and is in no way intended to limit the invention, or its application, or uses.

Figure 1:
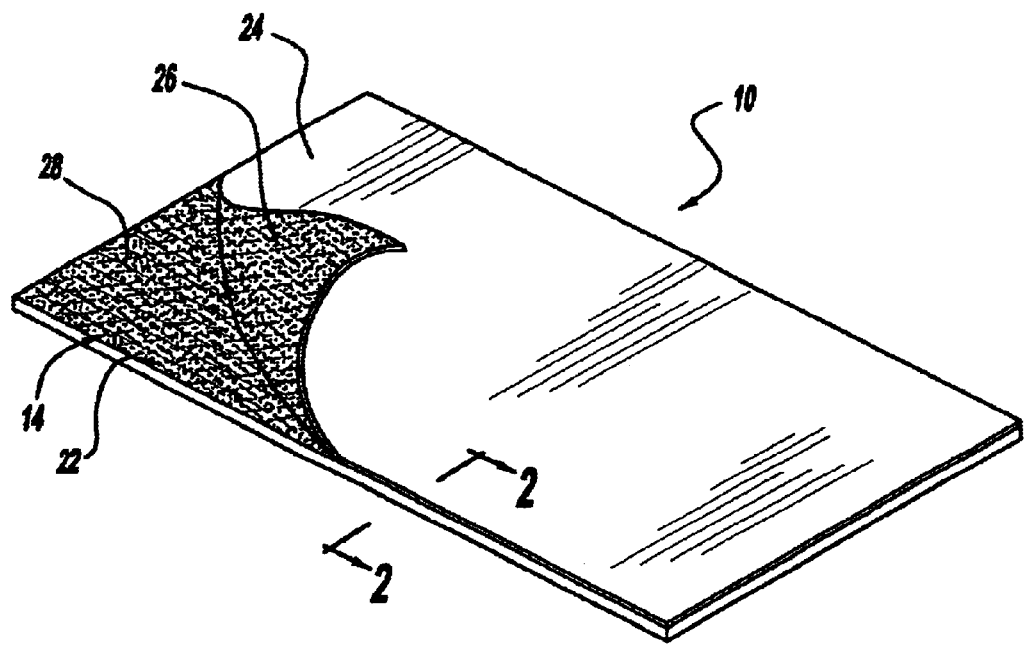
FIG. 1 is a perspective view of the reinforcing article in accordance with the teachings of the present invention.

Referring now to the drawings, shown in FIG. 1 is an article, a carbon fiber strip assembly 10 (here after just strip 10), for use in reinforcing a structure element 12, such as a concrete block wall, as seen in FIG. 3. In accordance with the teachings of the present invention, the strip 10 comprises a carbon fiber sheet 14 having a roughened surface 28 exposed or produced upon removal of a cover sheet 24.

To obtain the strip 10, a layer of carbon fiber 13 having a first surface 16 and a second surface 18, is provided. The first surface 16 and the second surface 18 of the carbon fiber 13 define a thickness 20. The fibers (not, specifically shown in the drawings) of the carbon fiber 13 are generally axial orientated with respect to the strip 10 for good tensile strength as is well known.

Figure 2:
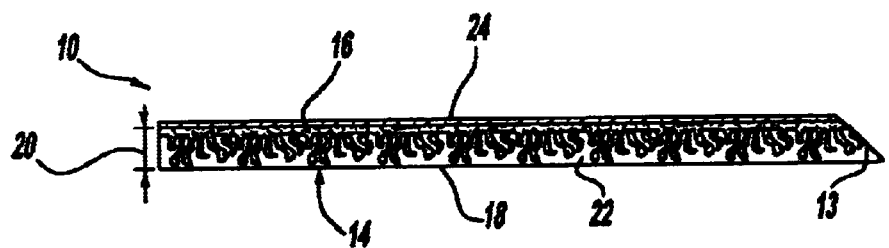
FIG. 2 is a sectional view taken substantially along line 2—2 in FIG. 1 of the present invention.

Referring in particular to FIGS. 1 and 2, a first epoxy resin 22 is applied to either the first surface 16 or the second surface 18 of the carbon fiber 13. In the preferred embodiment as illustrated in the drawings, the epoxy resin 22 is applied to the first surface 16 of the carbon fiber 13. Since the fibers in the carbon fiber 13 defines gaps or voids between them, the epoxy resin 22 permeates the entire thickness 20 of the carbon fiber 13 and a thin layer or at least some of the epoxy resin 22 remains on the surface 16 of the carbon fiber 13. In the preferred embodiment, the epoxy resin has a low viscosity such that when applied to the carbon fiber material it permeates between the fibers, but does not wet or soak the carbon fiber material.

As mentioned above, to provide a strong bond between the reinforcing article 10 and the reinforced structural element 12, it is important to have the surface of the article 10 clean and roughed. In order to keep the surface clean and provide a roughened surface, over the layer of epoxy resin 22 on the surface 16 is applied a flexible cover sheet 24 of impermeable textile, nylon or plastic material. The side of the cover sheet 24 in contact with the epoxy resin 22 preferably exhibits a texture, such as a woven texture surface 26. The carbon fiber 13, with the epoxy resin 22 and the cover sheet 24 applied, are subject to high temperature and pressure, via known techniques, allowing the epoxy resin 22 to cure. Once the epoxy resin 22 has cured, the result is a rigid carbon fiber sheet 14 having a removable cover sheet 24 covering one surface thereof. This rigid carbon fiber sheet 14 may then be cut or sawn into the desired sizes forming the strip 10. In this form, the strip 10 can be stored and or shipped to a job site for use.

At the job site, the cover sheet 24 prevents dirt, grease and other debris from coming into contact with the carbon fiber strip 14. Immediately prior to use, the cover sheet 24 is removed, or more accurately peeled away, from the surface 16 of the carbon fiber strip 14 leaving exposed a roughened surface 28. This roughened surface 28 is a result of at least two factors, individually or in combination. First, the textured surface 26 of the cover sheet 24 causes an impression to be formed in the epoxy resin 22 on the surface 16 as it cures. Second, as the cover sheet 24 is removed from the carbon fiber sheet 14, some of the epoxy resin 22 remains adhered to the plastic sheet 24 and breaks away from the carbon fiber sheet 14.

As illustrated in the drawing, the strips 10 are pre-cut and provided in suitable lengths for their intended use. However, it is possible to use large sheets and/or cut them to the required sizes before adhering them to reinforce a structural element 12.

Figure 4:
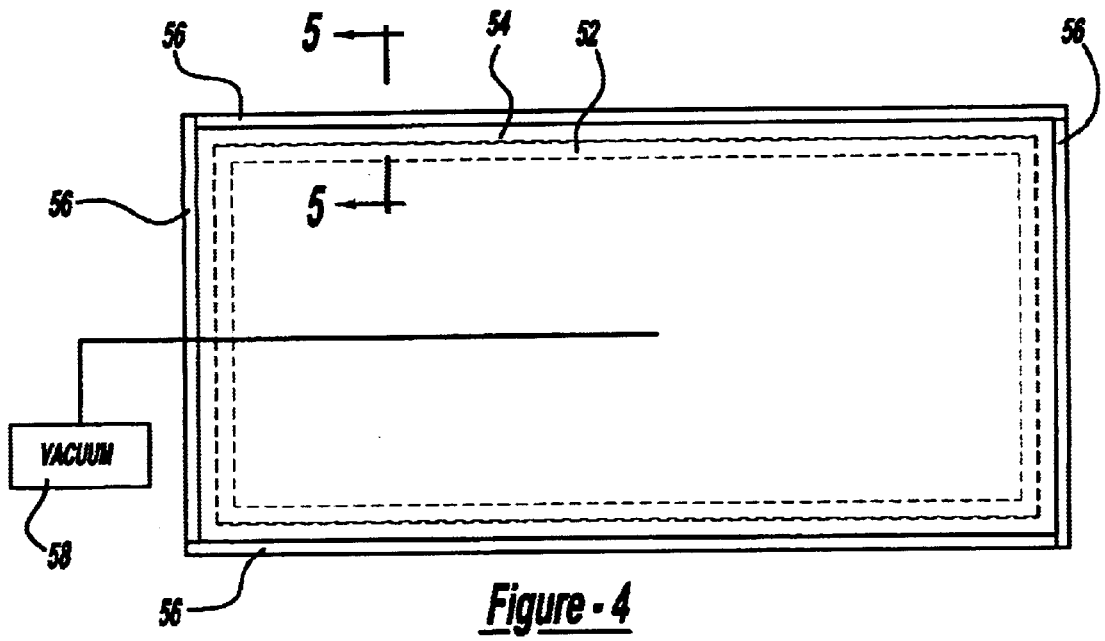
FIG. 4 is a top perceptive view of the reinforcing article being attached to a structural element in accordance with the teachings of the present invention.
Figure 5:
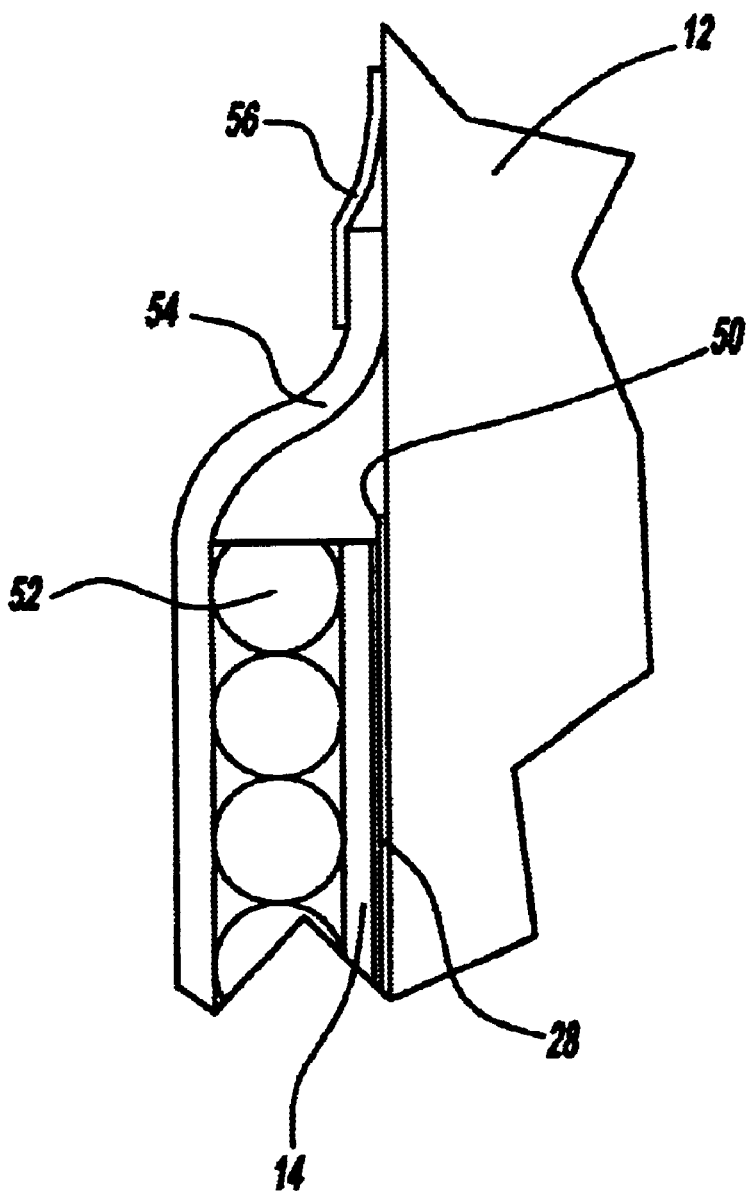
FIG. 5 is a sectional view taken along the line 5—5 in FIG. 4.

As shown in FIGS. 3–5, the strips 10 is intended to be attached to a structural element 12, such as a concrete block wall, the face 30 of which is being loaded in tension.

In order to attach the strip 10 to the structural element 12 to reinforce the same, a second epoxy resin 50 is applied to the structural element 12. The second epoxy resin 50 may be of the same kind or different kind from the first epoxy resin 22. The carbon fiber strip 14, with the plastic sheet 24 removed and the roughened surface 28 exposed is placed against the front face 30 of the structural member 12 where the second epoxy resin 50 has been applied, such that the roughened surface 28 is contacting the second epoxy resin 50.

In order to ensure that the carbon fiber strip 14 firmly adheres to the structural element 12, strip 14 should be held in place until the epoxy 50 cures. This is achieved in the method of the present invention by covering the strip 14 with a sheet of air impermeable material 54, such as a plastic sheet, and by positioning between the impermeable material 54 and the carbon fiber strip 14 a material 52 which will allow for uniform evacuation of air from between the impermeable material 54 and the structural element 12. In the preferred embodiment, the material 52 is a commercially available bubble wrap, such as that extensively used in the packaging industry. Alternatively, a permeable textile, fabric or other material which will facilitate even evacuation over the strip 14, may also be used. In the preferred embodiment, any commercially available plastic sheet may be used as a the impermeable material 54. The edges of the impermeable material 54 are then sealed to the structural element 12 through adhesives or adhesive strips 56.

With the impermeable material 54 so mounted to the structural element 12 over the carbon fiber strip 14, air is evacusted through use of a vacuum pump 58 coupled via a vacuum line and fitting to the impermeable sheet 54. Due to the presence of the material 52, when a vacuum is applied, a uniform pressure is applied over the entire strip 14. The vacuum is applied until the second epoxy resin 50 cures and the strip 14 firmly adheres to the structural element 12. Under this method, the normal curing time with common epoxies is expected to be about 3–4 hours, after which impermeable material 54 and material 52 are removed. The carbon fiber strip 14 will thereafter be firmly attached to the structural element 10 providing the desired reinforcement thereto.

While the above description constitutes the preferred embodiment of the present invention, it will be appreciated that the invention is susceptible to modification, variation and change without departing from the proper scope and fair meaning of the accompanying claims.

I claim:

1. A product for use in reinforcing a structural element, the product comprising:

a strip of carbon fiber material wherein the strip has a first side and a second side defining a thickness between the first and second sides;

a bonding agent substantially permeating the thickness of the strip and providing when cured rigidity to the carbon fiber material; and a sheet removably attached to one of the sides of the strip by the bonding agent, wherein the sheet when removed exposes a clean roughened surface defined at least in part by the bonding agent.

2. The product for use in reinforcing a structural element of claim 1 wherein the bonding agent is epoxy resin.

3. The product for use in reinforcing a structural element of claim 1 wherein the strip is at least partially permeable by the bonding agent.

4. The product for use in reinforcing a structural element of claim 1 wherein the sheet includes a textured surface to help form the roughened surface.

5. The product for use in reinforcing a structural element of claim 4 wherein the textured surface is a woven texture.

6. The product for use in reinforcing a structural element of claim 1 wherein the bonding agent fully permeates the thickness of the strip.

7. The product for use in reinforcing a structural element of claim 1 wherein the carbon fiber material is provided with a predetermined fiber orientation.

8. The product for use in reinforcing a structural element of claim 7 wherein the fiber orientation is such that a majority of fibers are oriented generally axially with respect to one another.

9. The product for use in reinforcing a structural element of claim 7 wherein the fiber orientation is such that a first group of fibers are generally obliquely oriented with respect to a second group of fibers.

10. The product for use in reinforcing a structural element of claim 7 wherein the fiber orientation is such that the fibers are generally longitudinally oriented with respect to the length of the strip.

* * * * *

UNITED STATES PATENT AND TRADEMARK OFFICE
CERTIFICATE OF CORRECTION

PATENT NO. : 6,746,741 B2
DATED : June 8, 2004
INVENTOR(S) : Wheatley

It is certified that error appears in the above-identified patent and that said Letters Patent is hereby corrected as shown below:

Column 1,
Line 27, after "respect" insert -- to --.

Column 2,
Line 11, after "attach" delete "to".
Line 25, after "operation" insert -- and --.
Line 35, after "applied to" delete "a".

Column 3,
Line 1, after "top" delete "perspective".
Line 24, "axial" should be -- axially --.
Line 56, "and or" should be -- and/or --.

Column 4,
Line 9, "is" should be -- are --.
Line 36, after "used as" delete "a".
Line 42, "evacusted" should be -- evacuated --.

Signed and Sealed this

Fifth Day of July, 2005

JON W. DUDAS
*Director of the United States Patent and Trademark Office*